United States Patent
Takahashi et al.

(10) Patent No.: US 8,949,947 B2
(45) Date of Patent: Feb. 3, 2015

(54) NETWORK SYSTEM AND NON-TRANSITORY COMPUTER-READABLE STORAGE MEDIUM

(71) Applicant: DeNA Co., Ltd., Tokyo (JP)

(72) Inventors: Kenichi Takahashi, Tokyo (JP); Sota Mizushima, Tokyo (JP); Hideo Kimura, Tokyo (JP); Hiroyuki Kawakami, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/039,680

(22) Filed: Sep. 27, 2013

(65) Prior Publication Data

US 2014/0096203 A1    Apr. 3, 2014

(30) Foreign Application Priority Data

Sep. 28, 2012  (JP) .................... 2012-218127

(51) Int. Cl.
*H04L 29/06* (2006.01)

(52) U.S. Cl.
CPC .................... *H04L 63/101* (2013.01)
USPC .................... 726/4; 726/14; 726/24

(58) Field of Classification Search
USPC ................. 726/4, 13, 24
See application file for complete search history.

(56) References Cited

U.S. PATENT DOCUMENTS

| | | | | |
|---|---|---|---|---|
| 7,953,862 B2* | 5/2011 | Bengtsson et al. | | 709/227 |
| 2009/0037976 A1* | 2/2009 | Teo et al. | | 726/1 |
| 2009/0232307 A1* | 9/2009 | Romanczyk et al. | | 380/270 |
| 2010/0042931 A1* | 2/2010 | Dixon et al. | | 715/738 |
| 2010/0318623 A1* | 12/2010 | Bloch et al. | | 709/206 |
| 2012/0324568 A1* | 12/2012 | Wyatt et al. | | 726/13 |
| 2013/0182183 A1* | 7/2013 | Sullivan et al. | | 348/584 |

FOREIGN PATENT DOCUMENTS

KR    1020070011711 A    1/2007

OTHER PUBLICATIONS

Communication dated Feb. 18, 2014, issued in KoreanPatent Application No. 10-2013-0111304, 6 pages.

* cited by examiner

*Primary Examiner* — Peter Shaw
*Assistant Examiner* — Ali Shayanfar
(74) *Attorney, Agent, or Firm* — Rothwell, Figg, Ernst & Manbeck, P.C.

(57) ABSTRACT

A network system according to the present invention includes a service providing server that provides an application service, a user terminal used by a user when using the application service, and a proxy server intervening between the service providing server and the user terminal. The user terminal includes a whitelist for an application in which at least a URL of the proxy server is described. The user terminal accesses the service providing server over the network and provides an application service to the user by starting the application program. When an access request to a URL of an access target specified by the application program is made during the provision of the application service, the user terminal compares the URL of the access target with a URL described in the whitelist for the application.

5 Claims, 5 Drawing Sheets

NETWORK SYSTEM AND NON-TRANSITORY COMPUTER-READABLE STORAGE MEDIUM

CROSS-REFERENCE TO RELATED APPLICATIONS

The present application claims priority upon Japanese Patent Application No. 2012-218127 filed on Sep. 28, 2012, which is herein incorporated by reference.

BACKGROUND

1. Technical Field

The present invention relates to a network system and a non-transitory computer-readable storage medium.

2. Related Art

A network system is known that allows users to create an application program by using a Web browser.

In such a network system, for example, when a malicious application creator describes a URL of an illegal site as a link target in the application program, application users are made to access the illegal site against their will, and therefore there is a risk of causing damage to the users.

SUMMARY OF THE INVENTION

The present invention has been conceived in view of the above issue, and an object thereof is to improve reliability of an access path when the application program is executed.

An aspect of the present invention to solve the above and other problems is a network system including:

a service providing server that provides an application service;

a user terminal connected to the service providing server over a network and used by a user when using the application service; and a proxy server intervening between the service providing server and the user terminal, wherein the user terminal includes:

a terminal storage unit that stores an application program for allowing a user to use the application service, the application program including a whitelist for an application in which at least a URL of the proxy server is described;

a service provision processing unit that accesses the service providing server over the network and executes a process of providing an application service to the user by starting the application program in response to an operational input by the user;

a terminal comparison unit that, when an access request to a URL of an access target specified by the application program is made during the provision of the application service, compares the URL of the access target with a URL described in the whitelist for the application; and a terminal access control unit that, based on a comparison result, when it is determined that the access request to the URL of the access target specified by the application program is an access request to the URL of the proxy server, permits access to the proxy server, and when it is determined that the access request is an access request to a URL of an access target not described in the whitelist for the application, blocks access to the access target or permits access to the access target under a predetermined condition.

Other features of this invention will become apparent from the description in the detailed description of the invention and the attached drawings.

DETAILED DESCRIPTION OF THE INVENTION

Figure 1:
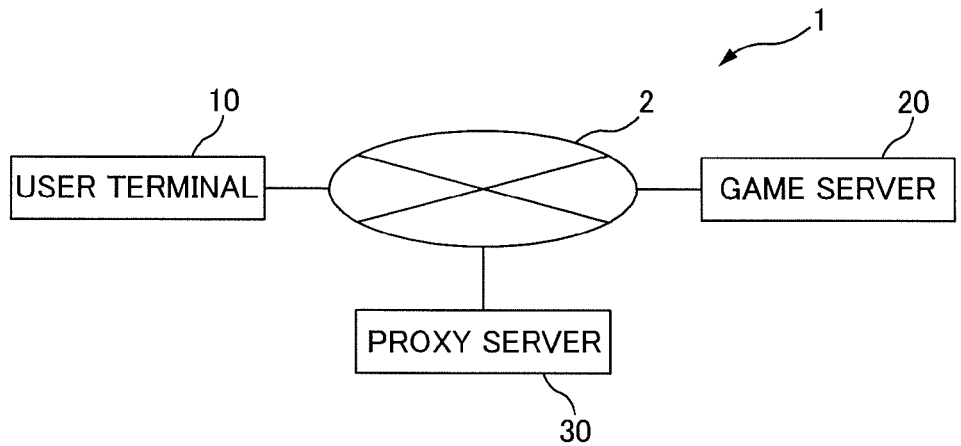
FIG. 1 illustrates an overall configuration of a network system 1.

With the detailed description of the present invention and the accompanied drawings, at least the following matters will be apparent.

In other words, a network system including:

a service providing server that provides an application service;

a user terminal connected to the service providing server over a network and used by a user when using the application service; and a proxy server intervening between the service providing server and the user terminal, wherein the user terminal includes:

a terminal storage unit that stores an application program for allowing a user to use the application service, the application program including a whitelist for an application in which at least a URL of the proxy server is described;

a service provision processing unit that accesses the service providing server over the network and executes a process of providing an application service to the user by starting the application program in response to an operational input by the user;

a terminal comparison unit that, when an access request to a URL of an access target specified by the application program is made during the provision of the application service, compares the URL of the access target with a URL described in the whitelist for the application; and a terminal access control unit that, based on a comparison result, when it is determined that the access request to the URL of the access target specified by the application program is an access request to the URL of the proxy server, permits access to the proxy server, and when it is determined that the access request is an access request to a URL of an access target not described in the whitelist for the application, blocks access to the access target or permits access to the access target under a predetermined condition.

According to such a network system, since URLs to be accessed are restricted to URLs of access targets described in the whitelist, it is possible to reduce damage caused to application users.

Furthermore, in such a network system, it is acceptable that the proxy server includes:

a data storage unit that stores a whitelist for a proxy server in which at least a URL of the service providing server is described;

a comparison unit that, when an access request to a URL of an access target is received from the user terminal, compares the URL of the access target with a URL described in the whitelist for the proxy server; and an access control unit that, based on a comparison result, when it is determined that the access request received from the user terminal is an access request to the URL of the service providing server, permits access to the service providing server, and when is an access request to a URL of an access target not described in the whitelist for the proxy server, blocks access to the access target, or permits access to the access target under a predetermined condition.

According to such a network system, also in the proxy server, since URLs to be accessed are restricted to URLs of access targets described in the whitelist, it is possible to further reduce damage caused to application users.

Also, in such a network system, it is acceptable that the network system further including an external server that is connected to the user terminal over the network and stores a latest whitelist for the application, wherein the user terminal accesses the external server each time the application program is started and downloads the latest whitelist for the application.

According to such a network system, since the whitelist is updated to the latest whitelist, it is possible to further reduce damage caused to application users.

Also, in such a network system, it is acceptable that in the whitelist for the application included in the application program, URLs of access targets that are permitted to be accessed are described in a binary form and encrypted.

According to such a network system, since the URL described in the whitelist can not be visually identified, it is possible to prevent the URL described in the whitelist from being rewritten as the URL of the illegal site.

Additionally, a non-transitory computer-readable storage medium storing a program executed by a computer serving as a user terminal that is connected through a proxy server to a service providing server providing an application service and is used by a user when using an application service, the program instructing the computer to perform the following processes:

a process of storing in a storage unit an application program for allowing a user to use the application service, the application program including a whitelist for an application in which at least a URL of the proxy server is described;

a process of accessing the service providing server over a network and executing provision of an application service to the user by starting the application program in response to an operational input by the user;

a process of, when an access request to a URL of an access target specified by the application program is received during the provision of the application service, comparing the URL of the access target with a URL described in the whitelist for the application; and a process of, based on a comparison result, when it is determined that the access request to the URL of the access target specified by the application program is an access request to the URL of the proxy server, permitting access to the proxy server, and when is an access request to a URL of an access target not described in the whitelist for the application, blocking access to the access target or permitting access to the access target under a predetermined condition.

According to such a program, it is possible to reduce damage caused to application users.

PRESENT EMBODIMENT

In the following embodiment, a detailed description will be given taking a network system 1 providing a service related to an application of a game as an example.

<Configuration of Network System 1>

FIG. 1 illustrates an example of an overall configuration of a network system 1 according to the present embodiment. The network system 1 according to the present embodiment includes a user terminal 10 connected over a network 2 (for example, the Internet and the like), a game server 20 as an example of a service providing server, and a proxy server 30.

<Configuration of User Terminal 10>

Figure 2:
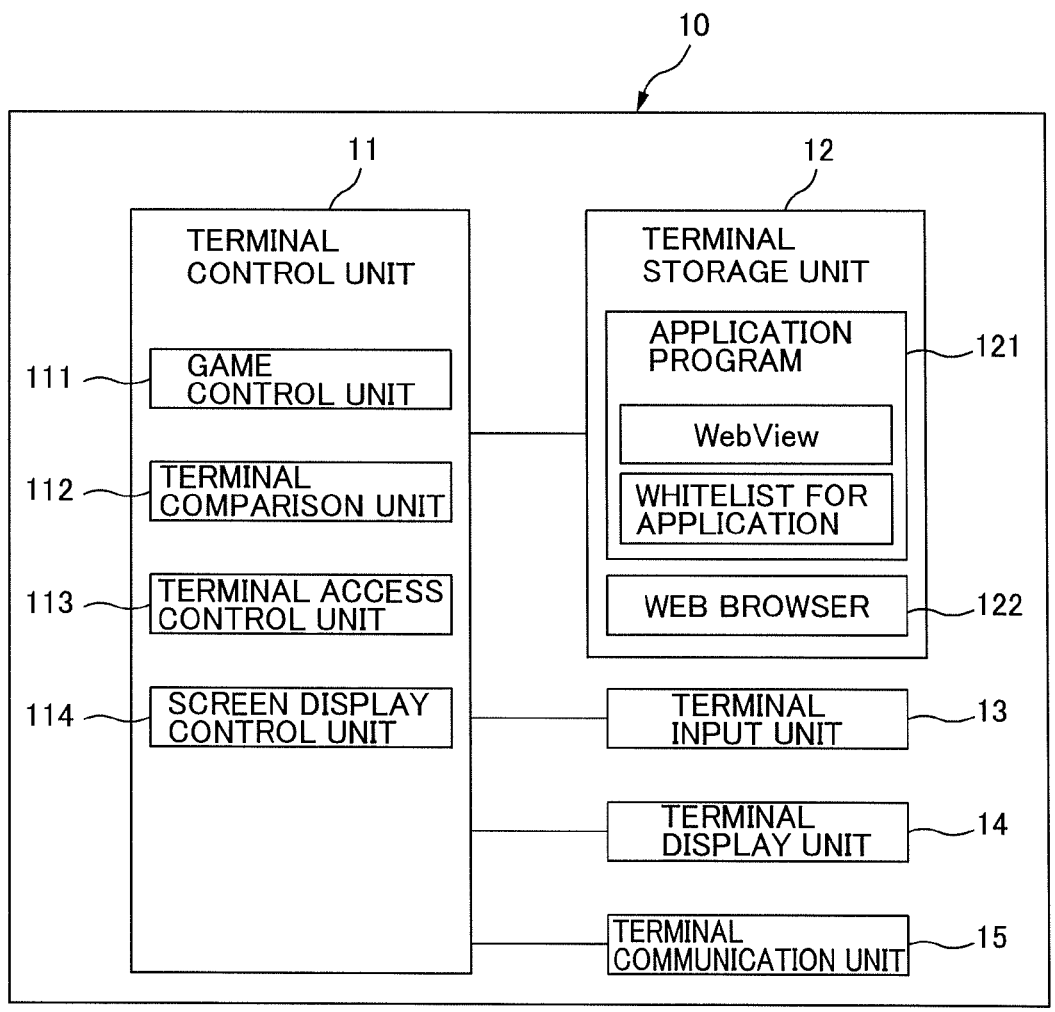
FIG. 2 is a block diagram of a functional configuration of a user terminal 10.

FIG. 2 is a block diagram of a functional configuration of a user terminal 10. The user terminal 10 according to the present embodiment is an information processing device (for example, a smartphone and the like) used by a user when playing a game. The user terminal 10 is able to display Web pages (game screen and the like) related to the game (a browser game and the like) on the screen by using an application program having a web browser function. More specifically, due to the start of such an application program, the user terminal 10 requests a Web page (game screen and the like) to the game server 20, receives a HTML file (including text, images, audio data, and the like) transmitted from the game server 20 that has responded to the request, and displays the Web page based on the description of this HTML file on the screen. The user terminal 10 includes a terminal control unit 11, a terminal storage unit 12, a terminal input unit 13, a terminal display unit 14, and a terminal communication unit 15.

The terminal control unit 11 is a unit that transfers data among the units and controls the entire user terminal 10, and is realized by a central processing unit (CPU) executing a system program and the like stored in a certain memory. The terminal control unit 11 according to the present embodiment includes a game control unit 111, a terminal comparison unit 112, a terminal access control unit 113, and a screen display control unit 114.

The game control unit 111 is an example of a service provision processing unit which executes a process of providing an application service to users. The game control unit 111 according to the present embodiment has a function to access the game server 20 and cause the game to proceed by starting an application program in response to an operational input by the user.

When an access request to a URL of an access target specified by the application program is made during the progress of the game (during the provision of the application service), the terminal comparison unit 112 has a function to compare the URL of the access target with the URL described in a whitelist for an application.

Based on the a comparison result made by the terminal comparison unit 112, the terminal access control unit 113 determines, for example, whether the access request to the URL of the access target specified by the application program is an access request to the URL of the proxy server 30 described in the whitelist for the application, or an access request to a URL of an access target that is not described in the whitelist for the application. The terminal access control unit 113 has a function to control access to the URL of the access target specified by the application program.

The screen display control unit 114 has a function to control a display mode of web pages (game screen and the like) displayed on the terminal display unit 14.

The terminal storage unit 12 is connected to the terminal control unit 11 through a bus, and the data stored in the terminal storage unit 12 is looked up, read, and rewritten in accordance with commands from the terminal control unit 11. This terminal storage unit 12 is realized, for example, by a flash memory, a hard disk, and the like. The terminal storage unit 12 according to the present embodiment stores an application program 121, a web browser 122, and the like.

The application program 121 is software for allowing users to play games and has a function as a web browser. This application program 121 includes a WebView, a whitelist for an application, a tool for applications (SDK, API, and the like), etc. The WebView is a program for adding a function of a normal web browser to the application program 121. By using this WebView and specifying a URL of the access target, the application program 121 is able to display on the application a web page transmitted from the specified access target. The whitelist for the application is data in which URLs of the access targets permitted to be accessed are described. In the present embodiment, at least a URL of the proxy server 30 is described in the whitelist. Note that, this whitelist is updated to the latest list at a predetermined timing, and stored in the terminal storage unit 12.

The web browser 122 is software for allowing the user terminal 10 to realize a function of displaying a web page. The user terminal 10 starts a web browser and requests a web page to an external server specified by the Web browser. The user terminal 10 is able to receive a HTML file transmitted from the external server that has received the request, and display on the web browser a web page based on the received HTML file.

The terminal input unit 13 is a unit for allowing users to perform various types of operation (game operation and the like), and is realized, for example, by a touch panel and the like.

The terminal display unit 14 is a unit for displaying web pages (game screen, operation screen, and the like) according to commands from the terminal control unit 11, and is realized, for example, by a liquid crystal display (LCD) and the like.

The terminal communication unit 15 is a unit for performing communication with an external device, and has a function as a reception unit for receiving various data and signals transmitted from the game server 20, proxy server 30, and the like, and a function as a transmission unit for transmitting the various data and signals to the game server 20, proxy server 30, and the like in accordance with commands from the terminal control unit 11. The terminal communication unit 15 is realized, for example, by a network interface card (NIC) and the like.

<Configuration of Game Server 20>

Figure 3:
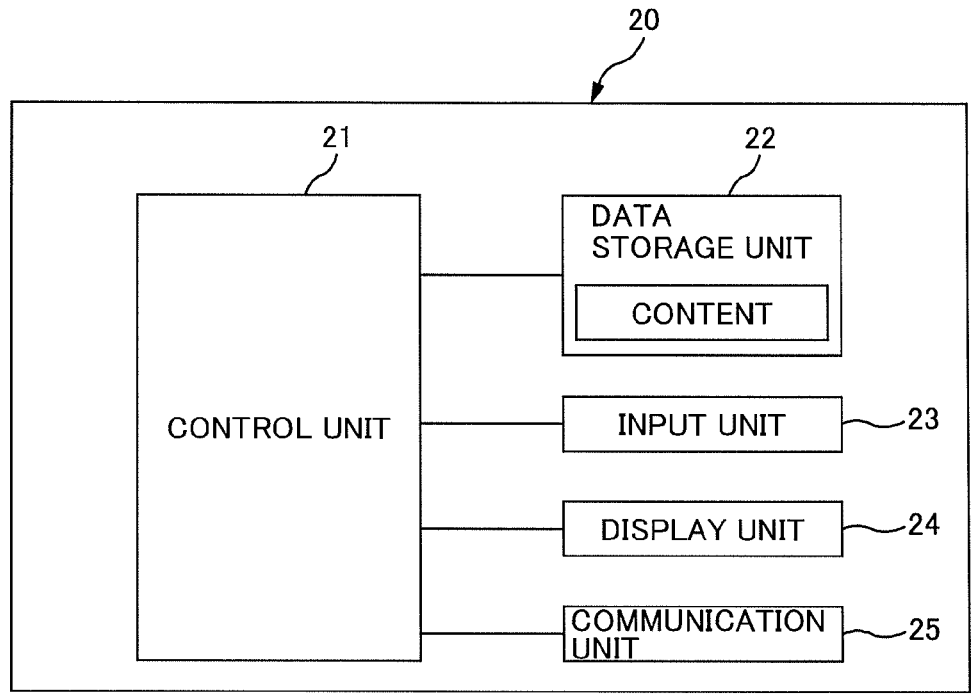
FIG. 3 is a block diagram of a functional configuration of a game server 20.

FIG. 3 is a block diagram of a functional configuration of a game server 20 according to the present embodiment. The game server 20 is an information processing device (for example, a workstation, a personal computer, and the like) used by a system operator, a system administrator, and the like that provide a game service. When various commands (requests) are received from the user terminal 10, the game server 20 is able to allow users to play games with the user terminal 10 by delivering web pages for a game created by a mark-up language (HTML and the like) suited to the standards of the user terminal 10. This game server 20 includes a control unit 21, a data storage unit 22, an input unit 23, a display unit 24, and a communication unit 25.

The control unit 21 is a unit that transfers data among the units and controls the entire game server 20, and is realized by a central processing unit (CPU) executing a program stored in a certain memory.

The data storage unit 22 has a read only memory (ROM) that is a read-only storage region in which system programs are stored, and a random access memory (RAM) that is a rewritable storage region which is used as a work area for computing processes performed by the control unit 21. The data storage unit 22 is realized, for example, by a non-volatile storage device such as a flash memory or a hard disk and the like. The data storage unit 22 according to the present embodiment stores contents (text data, image data, audio data, various types of programs, and the like) which are necessary for executing the application program.

The input unit 23 is a unit with which a system administrator, etc. input various types of data, and is realized, for example, by a keyboard, a mouse, and the like.

The display unit 24 is a unit for displaying a operation screen for a system administrator according to commands from the control unit 21, and is realized, for example, by a liquid crystal display (LCD) and the like.

The communication unit 25 is a unit that functions as a transmission and reception unit for transmitting and receiving various information to/from the user terminal 10, proxy server 30 and the like over the network 2, and is realized, for example, by a network interface card (NIC) and the like.

<Configuration of Proxy Server 30>

Figure 4:
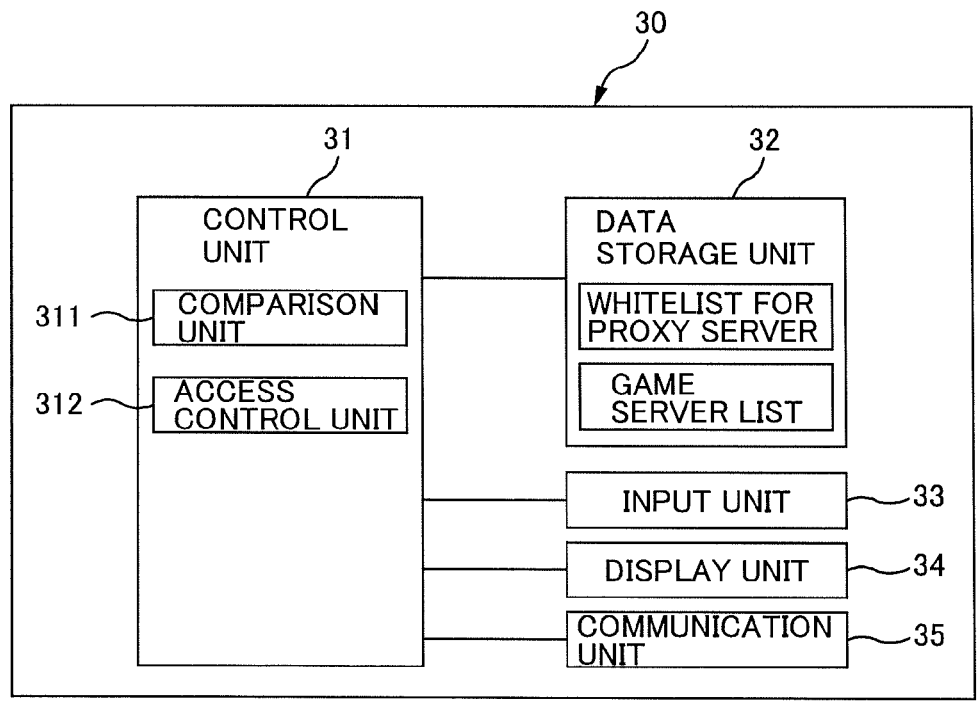
FIG. 4 is a block diagram of a functional configuration of a proxy server 30.

FIG. 4 is a block diagram of a functional configuration of a proxy server 30 according to the present embodiment. The proxy server 30 intervenes between the user terminal 10 and the game server 20. When an access request to the game server 20 is received from the user terminal 10, the proxy server 30 accesses the game server 20 that is a specified destination, as a proxy for the user terminal 10. Therefore, since the user terminal 10 that has accessed the game server 20 is not identified, it is possible to prevent leakage and the like, of personal information (terminal ID and the like) of the user. In the same manner as the foregoing game server 20, this proxy server 30 includes a control unit 31, a data storage unit 32, an input unit 33, a display unit 34, and a communication unit 35.

The control unit 31 according to the present embodiment includes a comparison unit 311 and an access control unit 312. When the comparison unit 311 receives an access request to the URL of the access target from the user terminal 10, the comparison unit 311 has a function to compare the URL of the access target with the URL described in a whitelist for the proxy server. Based on the comparison result performed by the comparison unit 311, the access control unit 312 has a function to determine, for example, whether the access request received from the user terminal 10 is an access request to the URL of the game server, or an access request to the URL of the access target that is not described in the whitelist for the proxy server, and to control access to the URL of the access target specified by the request from the user terminal 10.

The data storage unit 32 according to the present embodiment stores a whitelist for the proxy server in which URLs of access targets that are permitted to be accessed are described, a game server list, and the like. The whitelist for the proxy server is data in which the URL of the access target that is permitted to be accessed is described. In the present embodiment, at least the URL of the game server 20 is described in the whitelist. Note that, this whitelist is updated to the latest list at a predetermined timing, and stored in the data storage unit 32. The game server list is data in which the URL of the game server is described corresponding to an application ID identifying an application.

By providing a whitelist at the proxy server 30 side in this way, for example, even if the URL of the proxy server as an access target specified by the application program 121 is rewritten by a malicious person in order to cause the user to access an illegal site through the proxy server 30, it is possible to block access by the proxy server. Therefore, this can restrict access to the illegal site.

<Operation Example 1 of Network System 1>

Figure 5:
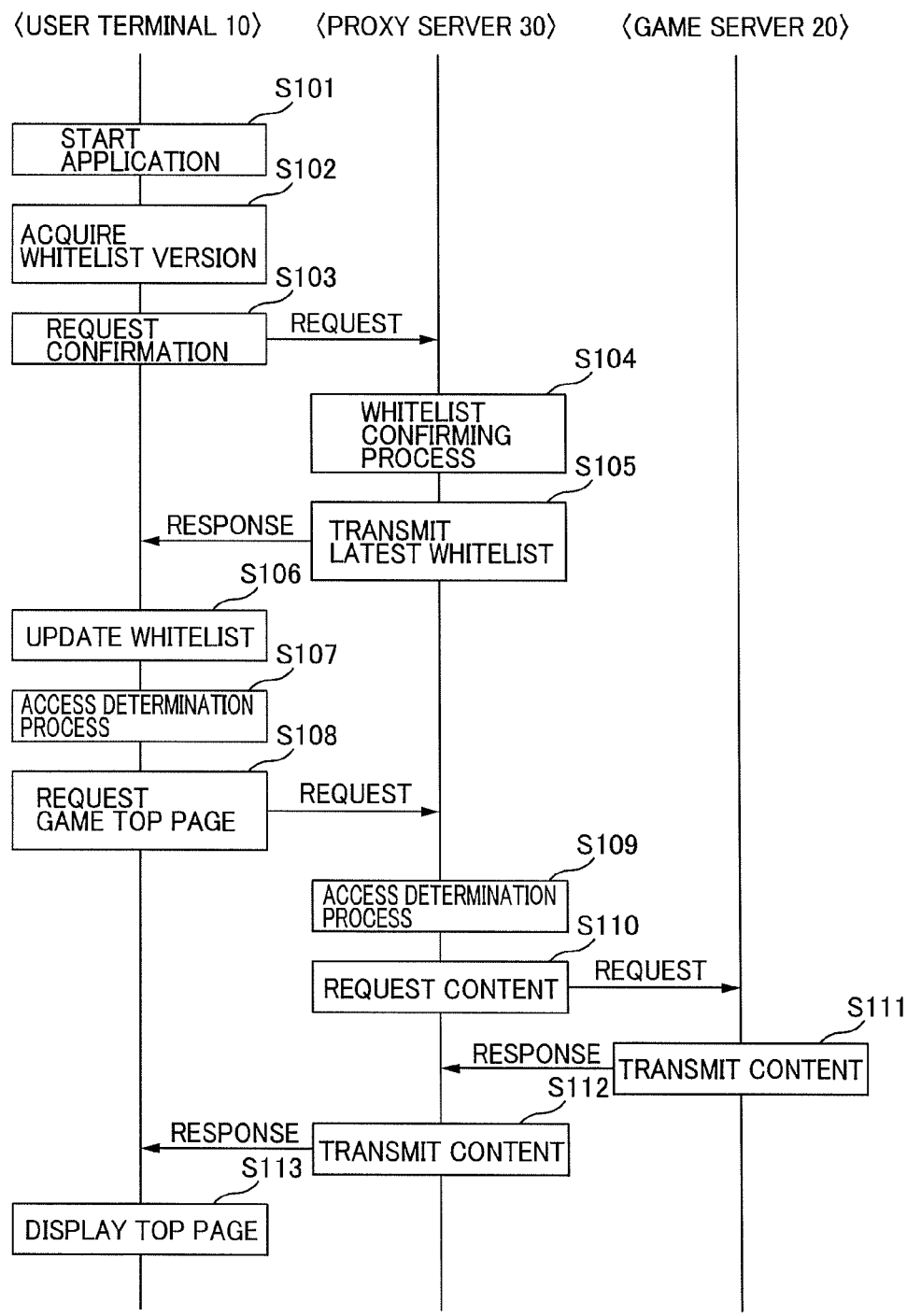
FIG. 5 is a flowchart describing an operation example 1 of the network system 1.

FIG. 5 is a flowchart describing an operation example (example 1) of the network system 1 according to the present embodiment.

First, in the user terminal 10, when the terminal control unit 11 receives an operational input by the user from the terminal input unit 13, the terminal control unit 11 allows a game control unit 111 to start an application program 121 for starting a game (S101).

Next, when the application program 121 is started, the terminal control unit 11 acquires version information of the whitelist for the application included in the application program 121 (S102). This version information is described in the whitelist for the application.

Next, the terminal control unit 11 transmits, to the proxy server 30 that is an access target through the terminal communication unit 15, a request to confirm that the whitelist for the application is the latest list (S103). This request includes the version information acquired in the step S102.

Next, when the request transmitted from the user terminal 10 is received by the communication unit 35, the control unit 31 in the proxy server 30 performs a whitelist confirming process (S104). More specifically, the control unit 31 accesses a whitelist server (not shown) that is an external server over a network, and acquires version information of the latest whitelist for the application stored in the whitelist server. Then, the control unit 31 compares the latest version information with the version information included in the received request, and confirms by determining whether or not the whitelist included in the received request is the latest whitelist for the application. Then, when such determination is denied, the control unit 31 transmits the latest whitelist for the application to the user terminal 10 (S105).

When the terminal control unit 11 in the user terminal 10 receives a response transmitted from the proxy server 30, the terminal control unit 11 rewrites and updates the whitelist for the application included in the application program 121 to the latest whitelist for the application included in this response (S106).

Next, the user terminal 10 performs an access determination process after starting the application program 121 (S107). The following is a specific description of the access determination process executed in the user terminal 10.

Figure 6:
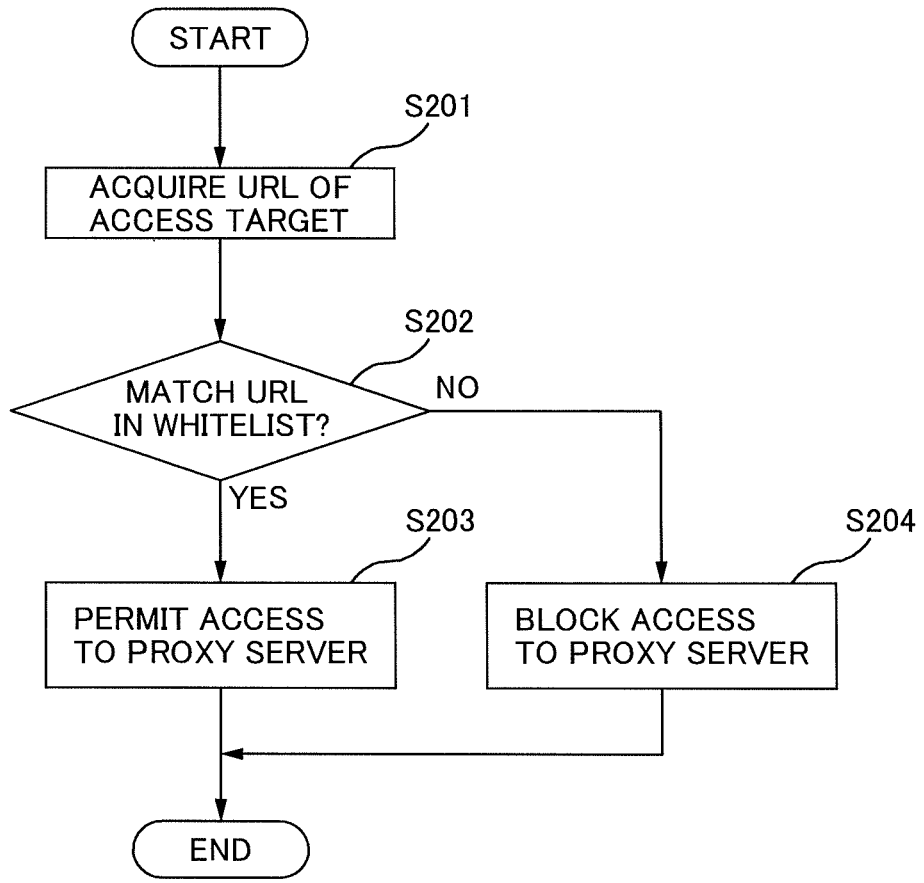
FIG. 6 is a flowchart describing an access determination process.

FIG. 6 is a flowchart describing an access determination process.

First, when the application program 121 requests the game server 20 to deliver a top page (Web page) of a game, the terminal control unit 11 allows the terminal comparison unit 112 to acquire a URL of the access target included in this request (S201). In this request, the URL of the proxy server 30 that serves as a proxy to access the game server 20 is described, and an application ID for identifying the application of the game is also described.

Next, the terminal comparison unit 112 compares the acquired URL of the access target with the URL in the whitelist for the application included in the application program 121. Then, the terminal access control unit 113 determines whether or not the acquired URL matches the URL in the whitelist for the application based on the comparison result performed by the terminal comparison unit 112 (S202).

More specifically, in the network system 1 according to the present embodiment, since the proxy server 30 serves as a proxy to access the game server 20, it is determined whether or not the acquired URL matches the URL of the proxy server that is an access target here. Usually, since the URL of the proxy server 30 that is a correct access target is described in the request made by the application program 121, each of the URLs will be matched. However, for example, in a case where a malicious application creator describes the URL of the illegal site as an access target, each of the URLs will not be matched.

When it is determined that the URL of the proxy server that is an access target is matched (S202: YES) based on the comparison result performed by the terminal comparison unit 112, the terminal access control unit 113 permits access to the proxy server 30 (S203). On the other hand, when it is determined that the URL of the proxy server that is an access target is not matched (S202: NO), the terminal access control unit 113 blocks access to the proxy server 30 (S204).

Here, determining whether the URL matches or not may be determined depending on whether both URLs exactly matches with each other or not, or may be determined depending on whether both URLs partially matches with each other by comparing a hostname, a directory name, or the like which configures a URL as a target for comparison.

In this way, when it is determined that the request (access request) to the URL of the access target specified by the application program 121 is a request (access request) to the URL of the proxy server 30 described in the whitelist based on the comparison result performed by the terminal comparison unit 112, the terminal access control unit 113 permits access to the proxy server 30.

Further, in the network system 1 according to the present embodiment, it is also determined whether or not the acquired URL matches a URL of the external server other than the URL of the proxy server in the URLs stored in the whitelist for the application. In this case, also, when it is determined that the acquired URL matches the URL in the whitelist for the application based on the comparison result performed by the terminal comparison unit 112, the terminal access control unit 113 permits access to the external server.

Further, when it is determined that the request (access request) to the URL of the access target specified by the application program 121 is an access request to the URL of the access target which is not described in the whitelist for the application based on the comparison result performed by the terminal comparison unit 112, the terminal access control unit 113 blocks access to the access target.

Note that, the access to the URL which is not described in the whitelist may be permitted under a predetermined condition without blocking access as described above. For example, by starting the Web browser 122, the screen display control unit 114 displays a Web page delivered from the access target that is not described in the whitelist, not on the application, but only on the Web browser. As a result, contents displayed on the application through the WebView can be restricted to only the Web page delivered from the access target in the whitelist. Therefore, since the content displayed at least on the application excludes the content from the access target that is not permitted to be accessed, the user can continue playing the game at ease. At this time, a pop-up message such as "you are trying to access the site not included in our service. Would you like to continue?" may be displayed on the Web browser in advance so as to arouse the attention of users.

Returning to FIG. 5, the terminal control unit 11 then transmits to the proxy server 30 that is an access target a request to deliver a top page of the game through the terminal communication unit 15 (S108).

Next, when the request transmitted from the user terminal 10 is received by the communication unit 35, the proxy server 30 performs an access determination process (S109).

More specifically, when the control unit 31 receives the request transmitted from the user terminal 10, the control unit 31 allows the comparison unit 311 to acquire an application ID included in this request. In this request, the application ID identifying the application program 121 is described.

Next, the comparison unit 311 acquires a URL of the game server corresponding to the acquired application ID by referring to the game server list stored in the data storage unit 32. Then, the comparison unit 311 compares the acquired URL of the game server with the URL in the whitelist for the proxy server stored in the data storage unit 32.

Next, when it is determined that the URL of the game server to be an access target matches the URL in the whitelist, based on the comparison result performed by the comparison unit 311, the access control unit 312 permits access to the game server 20. On the other hand, when it is determined that the URL of the game server to be an access target does not matches the URL in the whitelist, the access control unit 312 blocks access to the game server 20.

Here, determining whether the URL matches or not may be determined depending on whether both URLs exactly matches with each other or not, or may be determined depending on whether a host name, a directory name, or the like in the URL partially matches or not.

In this way, when it is determined that the request (access request) received from the user terminal is a request (access request) to the URL of the game server 20 described in the whitelist based on the comparison result performed by the comparison unit 311, the access control unit 312 permits access to the game server 20.

Further, when it is determined that the request (access request) received from the user terminal is an access request to the URL of the access target which is not described in the whitelist for the proxy server based on the comparison result performed by the comparison unit 311, the access control unit 312 blocks access to the access target.

Note that, the access to the URL which is not described in the whitelist may be permitted under a predetermined condition without blocking access as described above. This is also same as the access determination process in the user terminal 10.

Next, the proxy server 30 transmits to the game server 20 a request to deliver contents (a HTML file and the like) (S110).

When the game server 20 receives a request transmitted from the proxy server 30, the game server 20 generates a top page of the game requested from the application program 121. In other words, the game server 20 generates and transmits HTML files (including text, images, audio data, and the like), etc. as contents (S111).

Next, when the proxy server 30 receives the response transmitted from the game server 20, the proxy server 30 transmits the contents (HTML files and the like) to the user terminal 10 that has issued the request (S112).

Next, in the user terminal 10, when the terminal communication unit 15 receives a response transmitted from the proxy server 30, the screen display control unit 114 displays on the terminal display unit 14 a top page (Web page) of the browser game based on the description of the received HTML files by using the application program 121 (S113).

<Operation Example 2 of Network System 1>

Figure 7:
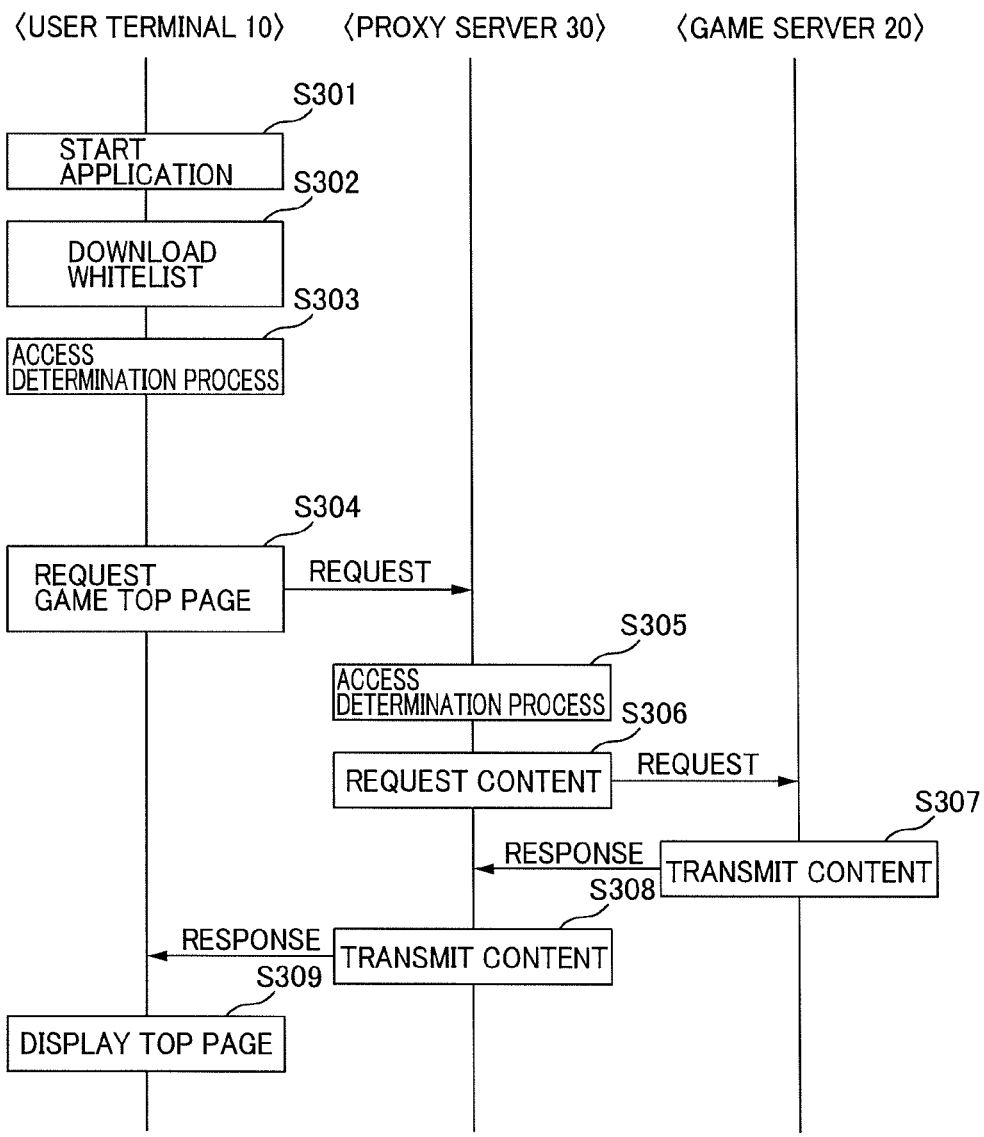
FIG. 7 is a flowchart describing an operation example 2 of the network system 1.

FIG. 7 is a flowchart describing an operation example (2) of the network system 1 according to the present embodiment.

First, in the user terminal 10, when the terminal control unit 11 receives from the terminal input unit 13 an operational input by the user, the terminal control unit 11 allows the game control unit 111 to start the application program 121 for starting the game (S301).

Next, when the application program 121 is started, the terminal control unit 11 downloads a whitelist (S302). More specifically, the terminal control unit 11 accesses a whitelist server (not shown) that is an external server over the network, and downloads a whitelist for the application stored in the whitelist server. Then, the terminal control unit 11 describes the whitelist for the application in the application program 121, and thereafter performs updating by recording the application program 121 in the terminal storage unit 12.

Next, the user terminal 10 performs an access determination process (S303). This access determination process is same as the process performed in the step S107 (see FIG. 6) described in the aforementioned operation example 1. However, this process differs in using the whitelist for the application that has been downloaded in the step S302.

Note that, since each of the processes in following steps 304 through 309 is the same as each of the processes in steps 108 through 113 described in the aforementioned operational example (example 1), the description thereof is omitted.

CONCLUSION

As described above, with the network system 1 according to the present embodiment, the access to the previously permitted access target can be restricted for each application by using the whitelist for the application included in the application program 121. Therefore, it is possible to reduce damage to application users caused by accessing an illegal site against their will. Further, by using the whitelist for the proxy server stored in the proxy server 30, even if the URL of the proxy server as an access target specified by the application program 121 is rewritten by a malicious person in order to cause the user to access an illegal site through the proxy server, it is possible to reduce damage such as being guided to the illegal site. As a result, it is possible to improve reliability of an access path when the application program is executed.

Other Embodiments

The present embodiment is for facilitating understanding of the present invention and does not intend to limit the interpretation of the present invention. Variations and modifications may be made in accordance with the spirit and scope of the present invention and equivalents thereof are included in the present invention. In particular, embodiments described below are to be included in the present invention.

<Whitelist>

In the foregoing network system 1 according to the present embodiment, an example was given to describe a case where the whitelist for the application included in the application program 121 and the whitelist for the proxy server stored in the proxy server 30 are used to control access. However, the present invention is not limited thereto. For example, the access may be controlled by not using both whitelists, but using only the whitelist for the application in the application program 121.

Further, in the whitelist for the application and the whitelist for the proxy server, the URL of the permitted access target may be described in binary form, and may be encrypted. As a result, since the URL described in the whitelist can not be visually identified, it is possible to reduce such actions in which a malicious person rewrites the URL described in the whitelist as the URL of the illegal site, and the like.

Further, URLs (content of a list) of the access targets described in the whitelist for the application and the whitelist for the proxy server may be same, or may be different. Note that, in the former case, the external server (whitelist server)

in which the latest whitelist is stored is not used, but the proxy server 30 in which the latest whitelist is stored may be substituted.

<Access Determination Process>

In the above-mentioned network system 1 according to the present embodiment, an example was given to describe a case where the access determination process is performed when starting the application. However, the present invention is not limited thereto. For example, under the control of the game control unit 111, the access determination process may be performed each time the application program 121 makes an access request to the game server 20 by allowing the user to perform a game operational input on the game operation screen (Web page). In other words, in this network system 1, the access determination process may be performed at any timing during the progress of the game (during the provision of the application service) from the start of the application program to the end of the game.

<Specification of Game Server>

In the operation example of the aforementioned network system 1 according to the present embodiment, an example was given to describe a case where the application program 121 does not directly specify the URL of the game server 20, but specifies the proxy server, and thereby allowing the user terminal 10 to access the game server 20 through the proxy server 30. However, the present invention is not limited thereto. That is, for example, in the step S108 shown in FIG. 5, an example was given to describe a case where when the application program 121 request the game server 20 to delivery a top page (Web page) of the game, the URL of the proxy server 30 specified by the application program 121 and an application ID are described in this request, and when the proxy server 30 receives the request, the access to the game server 20 corresponding to the application ID is permitted. However, the present invention is not limited thereto.

For example, the application program 121 transmits the URL including a parameter of a query, and therefore the URL of the subsequent game server 20 may be specified in the description of the URL of the proxy server 30. More specifically, the URL of the proxy server and the URL of the subsequent game server are specified by describing the URLs in a form of "proxy server URL?url=(game server URL)" in the application program 121.

What is claimed is:

1. A network system comprising:
    a service providing server configured to provide an application service;
    a user terminal connected to the service providing server over a network and configured to be used by a user when using the application service; and
    a proxy server configured to intervene between the service providing server and the user terminal, wherein
    the user terminal comprises:
        a terminal storage unit configured to store an application program that allows the user to use the application service, wherein the application program includes a whitelist for an application in which at least a URL of the proxy server is described;
        a service provision processing unit configured to access the service providing server over the network and execute a process of providing the application service to the user by starting the application program in response to an operational input by the user;
        a terminal comparison unit configured to, when an access request to a URL of an access target specified by the application program is made during the provision of the application service, compare the URL of the access target with at least one URL described in the whitelist for the application; and
        a terminal access control unit configured to, based on a comparison result, when it is determined that the access request to the URL of the access target specified by the application program is an access request to the URL of the proxy server, permit access to the proxy server, and configured to, when it is determined that the access request is an access request to a URL of an access target not described in the whitelist for the application, block access to the access target or permit access to the access target under a first predetermined condition, and configured to, when the application program is started, acquire version information of the whitelist for the application and transmit to the proxy server a request to confirm that the whitelist for the application is the latest list.

2. A network system according to claim 1, wherein the proxy server comprises:
    a data storage unit that stores a whitelist for the proxy server in which at least a URL of the service providing server is described;
    a comparison unit configured to receive an access request to a URL of an access target from the user terminal and compare the URL of the access target with a URL described in the whitelist for the proxy server; and
    an access control unit configured to, based on a comparison result, when it is determined that the access request received from the user terminal is an access request to the URL of the service providing server, permit access to the service providing server, and when it is determined that the access request to a URL of an access target not described in the whitelist for the proxy server, block access to the access target, or permit access to the access target under a second predetermined condition.

3. A network system according to claim 1, further including an external server connected to the user terminal over the network and wherein the external server is configured to store a latest whitelist for the application, and wherein the user terminal is configured to access the external server each time the application program is started and is configured to download the latest whitelist for the application.

4. A network system according to claim 1, wherein in the whitelist for the application included in the application program, URLs of access targets that are permitted to be accessed are described in a binary form and encrypted.

5. A non-transitory computer-readable storage medium storing a program executed by a computer serving as a user terminal that is connected through a proxy server to a service providing server providing an application service and is configured to be used by a user when using an application service, the program instructions when executed causing the computer to:
    store, in a storage unit, an application program for allowing the user to use the application service, wherein the application program includes a whitelist for an application in which at least a URL of the proxy server is described;
    access, the service providing server over a network and execute provision of the application service to the user by starting the application program in response to an operational input by the user;

acquire version information of the whitelist for the application and transmit to the proxy server a request to confirm that the whitelist for the application is the latest list;

compare, when an access request to a URL of an access target specified by the application program is received during the provision of the application service, URL of the access target with a URL described in the whitelist for the application; and permit access to the proxy server, based on a comparison result, when it is determined that the access request to the URL of the access target specified by the application program is an access request to the URL of the proxy server; and block access to the access target or permit access to the access target under a predetermined condition, when it is determined that the access request is an access request to a URL of an access target not described in the whitelist for the application.

* * * * *